United States Patent
Tai et al.

(10) Patent No.: US 8,604,092 B2
(45) Date of Patent: Dec. 10, 2013

(54) POLYMERIC COMPLEX SUPPORTER FOR CONTROLLING OXYGEN-RELEASING SUBSTANCES AND METHOD FOR MANUFACTURING THE SAME

(75) Inventors: Chin-Chih Tai, Kaohsiung (TW); Yuan-Pang Sun, Pingtung County (TW)

(73) Assignee: GeoNano Environmental Technology, Inc., Pingtung (TW)

( * ) Notice: Subject to any disclaimer, the term of this patent is extended or adjusted under 35 U.S.C. 154(b) by 134 days.

(21) Appl. No.: 13/086,376

(22) Filed: Apr. 13, 2011

(65) Prior Publication Data

US 2011/0257283 A1   Oct. 20, 2011

(30) Foreign Application Priority Data

Apr. 19, 2010   (TW) ............................... 99112195 A

(51) Int. Cl.
*C08J 9/35* (2006.01)
*C08J 9/00* (2006.01)
*C08J 9/28* (2006.01)

(52) U.S. Cl.
CPC . *C08J 9/0066* (2013.01); *C08J 9/28* (2013.01)
USPC ............................... 521/96; 521/145; 521/189

(58) Field of Classification Search
USPC .......................................... 521/96, 145, 189
See application file for complete search history.

(56) References Cited

U.S. PATENT DOCUMENTS

2010/0112087 A1*   5/2010   Harrison et al. .............. 424/615

FOREIGN PATENT DOCUMENTS

| CN | 101260199 A | | 9/2008 |
|---|---|---|---|
| CN | 101549176 | * | 10/2009 |
| EP | 1724237 | * | 11/2006 |
| GB | 2118945 A | | 11/1983 |
| WO | WO 2010117267 A1 | * | 10/2010 |

OTHER PUBLICATIONS

Calcoum Peroxide, Sigma Aldrich, 2000.*

* cited by examiner

*Primary Examiner* — Irina S Zemel
(74) *Attorney, Agent, or Firm* — CKC & Partners Co., Ltd.

(57) ABSTRACT

A polymeric complex supporter for controlling oxygen-released compounds (PCS-ORCs) and a method for manufacturing the same is disclosed. PCS possesses a porous surface and internal coralloid-like channel structure that can accommodate ORCs with a high ratio (up to 92 wt %) to polymers. In applications, the PCS-ORCs can be shaped as various types and be coupled with other solids that could be used as delivery tools. As PCS-ORCs is delivered into a water-containing environment, water molecules can diffuse into the internal channels through the surface pores and then react with ORCs. Due to the tunable structure properties of PCS, the produced oxygen can be release out through the surface pores for one to six months long. In comparison with powder-type ORCs, PCS-ORCs can exhibit better application potentials in terms of time-release technology, oxygen delivery and environmental responsibility.

9 Claims, 12 Drawing Sheets

POLYMERIC COMPLEX SUPPORTER FOR CONTROLLING OXYGEN-RELEASING SUBSTANCES AND METHOD FOR MANUFACTURING THE SAME

RELATED APPLICATIONS

The present application is based on, and claims priority from, Taiwan Application Serial Number 99112195, filed Apr. 19, 2010, the disclosure of which is hereby incorporated by reference herein in its entirety.

FIELD OF THE INVENTION

This invention generally relates to a polymeric complex supporter (PCS) for controlling gas-releasing compounds and a method for manufacturing the same, and more particularly, to a PCS for controlling oxygen-releasing compounds (ORCs) and a method for manufacturing the same, which can be delivered with a tunable released rate of oxygen for soil and groundwater remediation.

BACKGROUND OF THE INVENTION

For petroleum contaminants such as BTEX (benzene, toluene, ethylbenzene, xylenes), natural bacteria generally can degrade them into harmless compounds in appropriate environmental conditions. This process is usually oxygen demand. However, the aquifer mostly is oxygen deficit that slows or even stops the biodegradation process. If additional oxygen can be offered sufficiently into aquifer, the aerobic process can be reactivated.

As it has been known, using oxygen-releasing compounds (ORCs) (for example, magnesium peroxide, calcium peroxide and so on) to deliver oxygen could be a cost-effective way for soil and groundwater remediation, because it is a water-driving process without the need of powder. In real applications, however, pure magnesium peroxide or calcium peroxide reacts with water so fast that bacteria cannot utilize the produced oxygen in time.

According to prior research studies, pure ORCs could be turned into time-released compounds by the intercalation of phosphate into the crystal structure of ORCs. This method still produces original powder-type ORCs which can be used as a slurry and injected by press into aquifer or suspended in wells by so-called "socks" holders. Such powder type and delivering ways, however, are facing several issues. For example, ORC powders are hard to be dispersed in aquifer that caused oxygen distribution not evenly; the end products [ex. $Ca(OH)_2$] can not be withdrawn from aquifer, which caused higher pH (>10) in groundwater.

Therefore, in terms of ORCs' time-release technology, material type, and delivery, it should be necessary to provide a better method that can be used to manufacture tunable time-release ORCs and can generate more cost-effective and environment-friendly delivery for ORCs.

SUMMARY OF THE INVENTION

Accordingly, an aspect of the present invention provides a polymeric complex supporter (PCS) for controlling ORCs (PCS-ORCs) that can accommodate high amount (up to approximately 92 parts by weight) of ORCs and control the oxygen-releasing rate. The surface pore size, porosity, hydrophilicity, and internal structure of PCS can be tailored through the manufacturing process, so that PCS can be functioned as a gate for the influent water and a regulator for the effluent oxygen, respectively. As PCS-ORCs is immersed in a water-containing environment, water molecules gradually diffuse into the internal channels through surface pores and react with ORCs. Oxygen is then generated from the internal channels and continuously released out through surface pores for one to six months long, up to one year or even over one year. PCS-ORCs can be used as a long-term source of oxygen for enhancing aerobic biodegradation processes.

Another aspect of the present invention provides a method for manufacturing PCS-ORCs, which intergrades both solidification and functionalization of PCS in a drying and wetting mixed process. ORC powders were embedded into a three-dimensional internal space in PCS. The surface pore size, porosity, hydrophilicity, and internal structure of PCS can be tailored, with which PCS can be functioned as a regulator for controlling the oxygen-released rate of ORCs.

According to the aforementioned aspect of the present invention, PCS-ORCs is disclosed. In an embodiment, PCS may include but not limited in 1 part to 92 parts by weight of ORCs and 8 parts to 99 parts by weight of polymers. As PCS-ORCs is immersed in a water-containing environment, water molecules diffuse into the internal coralloid-like channel structure through surface pores and then react with ORCs. The generated oxygen can be continuously released out through surface pores for one to six months long, up to one year or even over one year.

In a preferred embodiment, the oxygen-releasing compounds may include peroxides that may have an average diameter from 1 nanometer (nm) to 100 micrometers (μm).

In a preferred embodiment, PCS may possess an internal coralloid-like channel structure, a plurality of pores disposed thereon. The surface pores may have an average pore size from 1 nm to 100 μm, for example.

In a preferred embodiment, the polymeric complexes may be sulfone polymers or fluorine-containing polymers.

In a preferred embodiment, PCS may further include a buffering reagent and/or a bionutrient except for ORCs.

In a preferred embodiment, the water-containing environment may refer to ocean, river, lake, sewerage, ditch, aquifer, cistern, sediment or soil.

According to other aspects of the present invention, a method for manufacturing PCS-ORCs is disclosed. In an embodiment, the method can include the following steps. First, a mixture is prepared, which can include but not limited in 1 part to 92 parts by weight of ORCs, 8 parts to 99 parts by weight of polymers, and an organic solvent. Second, vacuuming may be performed to remove air bubbles in the mixture. Afterward, both solidification and functionalization may be performed through a combination process of wet and dry treatments. The formed PCS-ORCs has an internal coralloid-like channel structure with tunable affinity toward water and a porous surface with tunable pore sizes from 1 nm to 100 μm. As PCS-ORCs is immersed in a water-containing environment, water molecules diffuse into the internal coralloid-like channel structure through the surface pores and then react with ORCs. The release of produced oxygen may be regulated due to the surface pore sizes of PCS. The tunable time-release oxygen may be sustained for one to six months long, up to one year or even over one year.

In a preferred embodiment, PCS-ORCs may be shaped as various types, such as thin film, granule, hollow tube, rod or other solid types, depending on the demand of applications.

In a preferred embodiment, the method for manufacturing PCS-ORCs may be conducted in a batch process or a continuous process.

With respect to the aforementioned PCS-ORCs and manufacturing thereof, the internal coralloid-like channel structure of PCS can accommodate high amount of ORCs, and PCS-ORCs may be shaped as various types. As PCS-ORCs is immersed in a water-containing environment, water molecules diffuse into the internal coralloid-like channel structure through surface pores and then react with ORCs. The time-released oxygen can continue for one to six months long, up to one year or even over one year.

BRIEF DESCRIPTION OF THE DRAWINGS

The foregoing aspects and many of the attendant advantages of this invention are more readily appreciated as the same become better understood by reference to the following detailed description in conjunction with the accompanying drawing, wherein.

DETAILED DESCRIPTION OF THE PREFERRED EMBODIMENT

Figure 1:
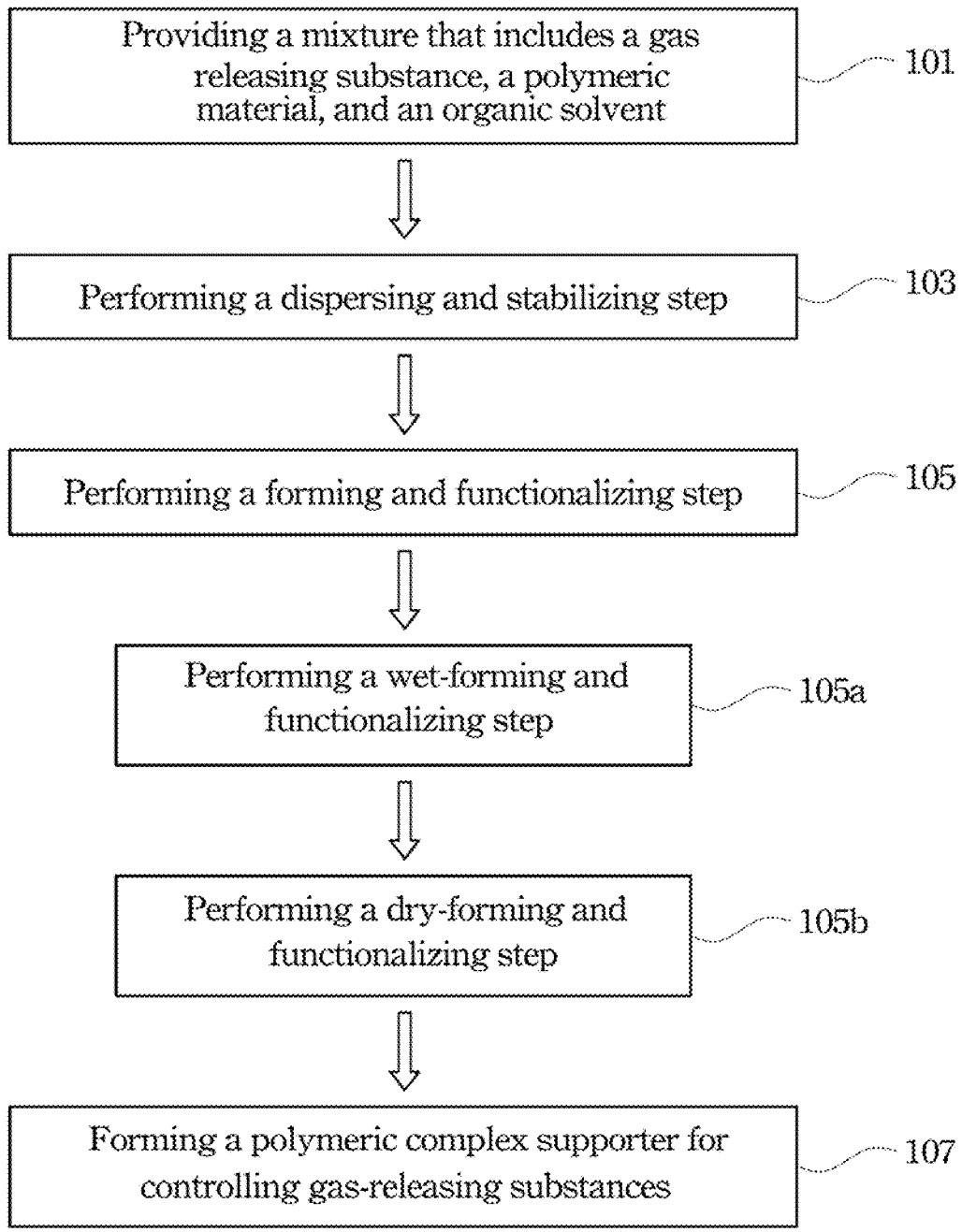
FIG. 1 depicts a partial flow chart of a method for manufacturing PCS-ORCs according to an embodiment of the present invention.

Accordingly, the present invention provides a polymeric complex supporter (PCS) for controlling oxygen-releasing compounds (ORCs) and manufacturing thereof, where the internal coralloid-like channel structure of PCS can accommodate high amount of ORCs.

The "PCS-ORCs" described in the present invention refers to the formulated PCS that accommodates ORCs. The surface pore size, porosity, hydrophilicity, and internal coralloid-like channel structure of PCS can be tailored, thereby regulating the oxygen-releasing rate of ORCs. Therefore, PCS-ORCs can be used as a long-term oxygen source for enhancing aerobic biodegradation processes in the environment. In an embodiment, PCS can accommodate high amount of ORCs in the spacious structure.

"The internal coralloid-like channel structure" described in the present invention refers to the structure in PCS. The internal coralloid-like channel structure is constructed by polymeric connections, where the diffusion of water and oxygen molecules is constrained so that the produced oxygen can be continuously released for a long time.

"The oxygen-releasing compounds (ORCs)" described in the present invention refers to the one that can release oxygen as contacts with water. ORCs can be used to facilitate the growth of aerobes. Also, the particle size of ORCs with average diameter, for example, from 1 nm to 100 µm can affect the oxygen-releasing rate.

In an embodiment, ORCs may include peroxides. In an example, the peroxides may include but not be limited to magnesium peroxide, calcium peroxide or any combination thereof. As the peroxides contacts with water, oxygen is produced automatically as the following reaction formula (I).

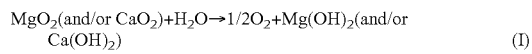

$$MgO_2(\text{and/or } CaO_2)+H_2O \rightarrow 1/2 O_2+Mg(OH)_2(\text{and/or } Ca(OH)_2) \quad (I)$$

As the above description, PCS can accommodate high amount of ORCs. As PCS-ORCs is immersed in a water-containing environment, water molecules diffuse into the internal coralloid-like channel structure through surface pores and then react with ORCs.

"The water-containing environment" refers to all water-containing environments, which may include but not be limited to ocean, river, lake, sewerage, ditch, aquifer, cistern, sediment, soil or the likes. According to an embodiment, by using different particle size of ORCs and by tailoring the surface pore size, porosity, internal coralloid-like channel structure and hydrophilicity of PCS, the fast produced oxygen can be turned into a tunable time release in a water-containing environment.

In an embodiment, PCS can accommodate more amount of ORCs. In an example, PCS-ORCs may be formulated by missing 8 parts to 99 parts by weight of polymers and 1 part to 92 parts by weight of ORCs. In another example, PCS-ORCs may be formulated by missing 8 parts to 95 parts by weight of polymers and 5 parts to 92 parts by weight of ORCs. In a further example, PCS-ORCs may be formulated by missing 8 parts to 50 parts by weight of polymers and 50 parts to 92 parts by weight of ORCs.

In another embodiment, ORCs may have an average pore size from 1 nm to 100 µm. PCS may have an internal coralloid-like channel structure and a plurality of surface pores with an average pore size from 1 nm to 100 µm. PCS accommodates more amount (for example, up to 92 parts by weight) of ORCs. Moreover, depending on practical requirements, hydrophilicity of PCS can be modulated by selecting hydrophilic polymeric materials, hydrophobic polymeric materials or any combination thereof. In an example, the used polymeric materials may belong to sulfone polymers or fluorine-containing polymers. The sulfone polymers may include but not be limited to polyethersulfone (PESF), polysulfone (PSF) or polyphenylene sulfone (PPSF). The fluorine-containing polymers may include polyvinylidene fluoride (PVDF).

In a further embodiment, PCS-ORCs may optionally include buffering reagents and/or bionutrients, which are used to buffer the pH in the water-containing environment. In an example, the buffering reagents may include but not be limited to calcium carbonate, calcium bicarbonate or any combination thereof. In another example, the bionutrients may include but not be limited to sugar, starch, phosphate or any combination thereof. The additions may also enhance the growth of microorganisms in the water-containing environment.

In a still another embodiment, PCS-ORCs may be manufactured as follows. Reference is made to FIG. 1, which depicts a partial flow chart of a method for manufacturing PCS-ORCs according to an embodiment of the present invention. In an example, First, a mixture that can include 1 part to 92 parts by weight of ORCs, 8 parts to 99 parts by weight of polymers, and an organic solvent used for the dissolution of polymers and the dispersion of ORCs is prepared, for example, as shown in the step 101. In this example, the polymers may be exemplified as the aforementioned materials. The organic solvent may include but not be limited to N,N-Dimethyl formamide (DMF), 1-methyl 2 pyrrolidione (NMP) and N, N-dimethylacetamide (DMAc). In another example, the mixture may have other different ratios of parts by weight of ORCs and polymers as disclosed previously, not being recited in detail herein. In a further example, the mixture may optionally include buffering reagents and/or bionutrients as aforementioned.

Following, a dispersion and stabilization step may be optionally conducted as shown in the step 103, where dispersants may be added and mixed at a stirring speed from 50 revolutions per minute (rpm) to 500 rpm for 6 hours and 24 hours, approximately. The mixing is conducted until the mixture without visible sedimentation. In an example, the dispersants may include polymeric dispersants containing polycarboxylate, polyvinyl alcohol, or polyacrylamide, for example. In another example, an amount of the dispersant in PCS-ORCs may be 0.1 parts to 2 parts by weight. It is noted that, the polymeric dispersant may include other dispersants with the same or similar ingredients, such as commercial dispersants of Hypermer™KD-1~5 or KD-8~11 (Uniqema, Netherlands), not being limited to the above description. Next, a vacuuming step may be conducted to remove air bubbles in the mixture.

After that, a solidification and functionalization step (in the step 105) may be conducted, where the formation and functionalization step may include but not be limited to a wet formation and functionalization step (as shown in the step 105a) and a dry formation and functionalization step (as shown in the step 105b), so as to make the mixture to form PCS-ORCs.

In detail, in an embodiment, during the wet formation and functionalization (as shown in the step 105a), the mixture may be swollen in a coagulant in a temperature range from 0° C. to 40° C. for 0.5 minute to 5 minutes, for example. That can partially remove the organic solvent and the coagulant and then form a composite material. In an example, the wet formation and functionalization step may be conducted in a temperature range from 5° C. to 15° C. In another example, an appropriate coagulant solvent may include but not be limited to methanol, ethanol, propanol, acetone, water or any combination thereof. In this embodiment, for the formation of the composite materials with various shapes, many conventional methods can be applied to have a flake-like, a granule-like, a hollow tube-like or a bar-like shape for the composite materials. Those conventional methods are familiar to the artisan in this art, not being recited in detail herein.

Figure 2A:
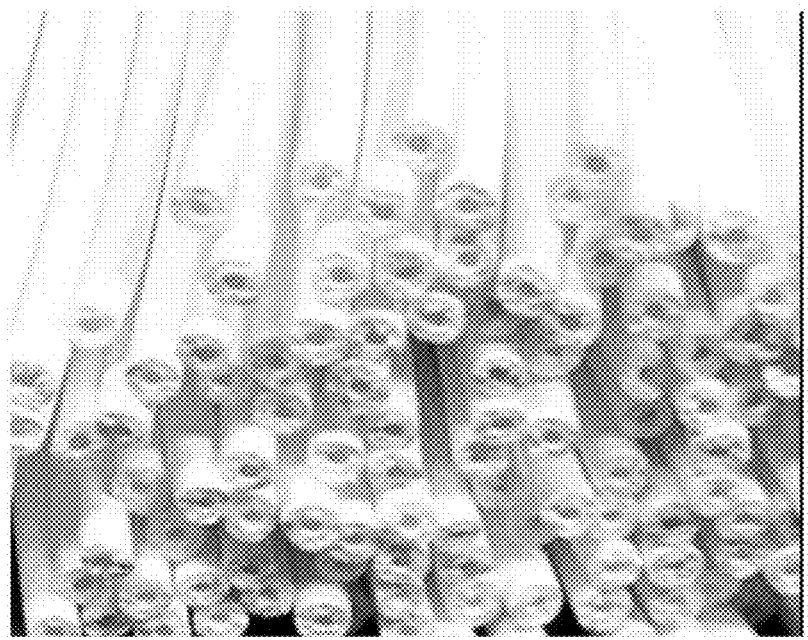
FIGS. 2A to 2C show several shapes of PCS-ORCs according to several embodiments of the present invention.
Figure 2B:
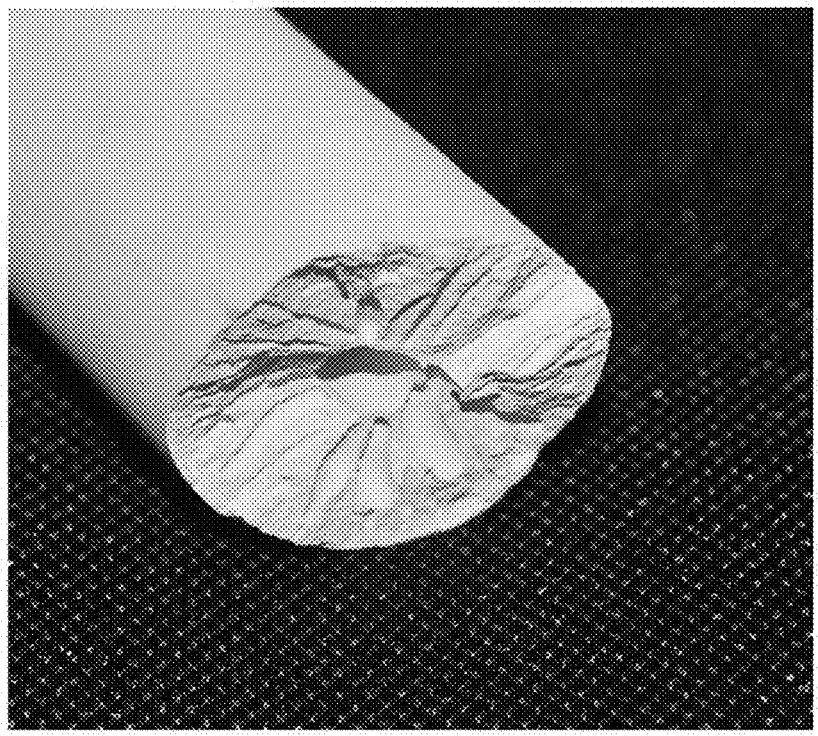
Figure 2C:
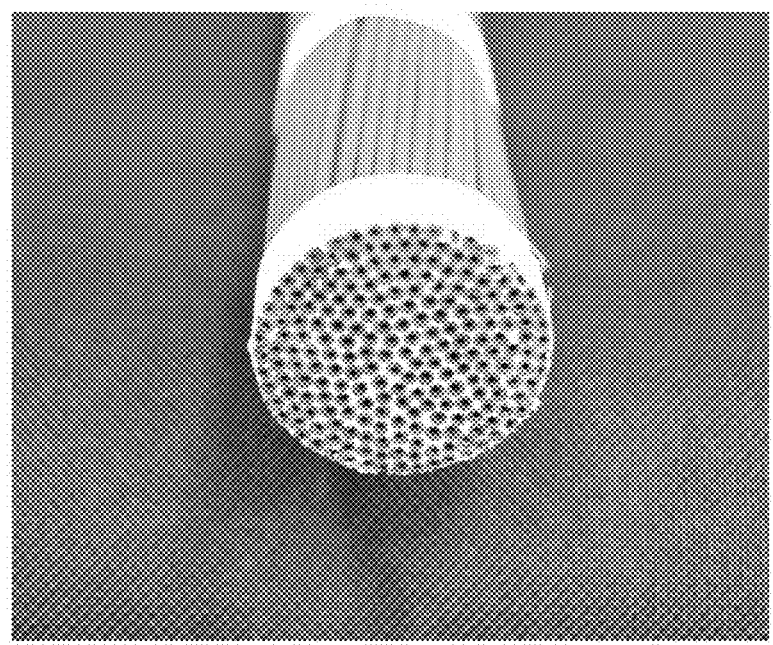

In another embodiment, during the dry formation and functionalization (as shown in the step 105b), the as-synthesized material is dried in a temperature range from 90° C. to 150° C. for 15 minutes to 30 minutes, for example, which removes the residual organic solvent and forms PCS-ORCs, as shown in the step 107. In an example, the drying and functionalizing step may be conducted in a temperature range from 100° C. to 120° C. In another example, the resulted PCS-ORCs may have arbitrarily plastic shapes, such as a flake-like, a granule-like, a hollow tube-like or a rod-like shape. For example, that refers to FIGS. 2A to 2C, which show several shapes of PCS-ORCs according to several embodiments of the present invention. FIG. 2A depicts a hollow tube-like shape of PCS-ORCs, FIG. 2B depicts a hollow rod-like shape of PCS-ORCs, and FIG. 2C depicts a hollow tube-like shape of PCS-ORCs. In a further example, the resulted PCS-ORCs may have a thickness from 1 μm to 1000 μm, for example. In a still another example, the resulted PCS-ORCs may have a thickness from 50 μm to 500 μm, for example.

Before preceding the solidification and functionalization step (as shown in the step 105), the as-synthesized material may be solely molded into various shapes. Moreover, the as-synthesized may be optionally and uniformly coated onto other solids by various coating skills. Different solids may be coated by different coating skills. In an embodiment, the as-synthesized may be coated on a flake-like solid (e.g., steel plate) by a blade coating or spin-on coating. In another embodiment, a granule-like, a hollow tube-like or a rod-like substrate can be immersed into the as-synthesized, and uniformly forms a film on the surface.

Figure 3A:
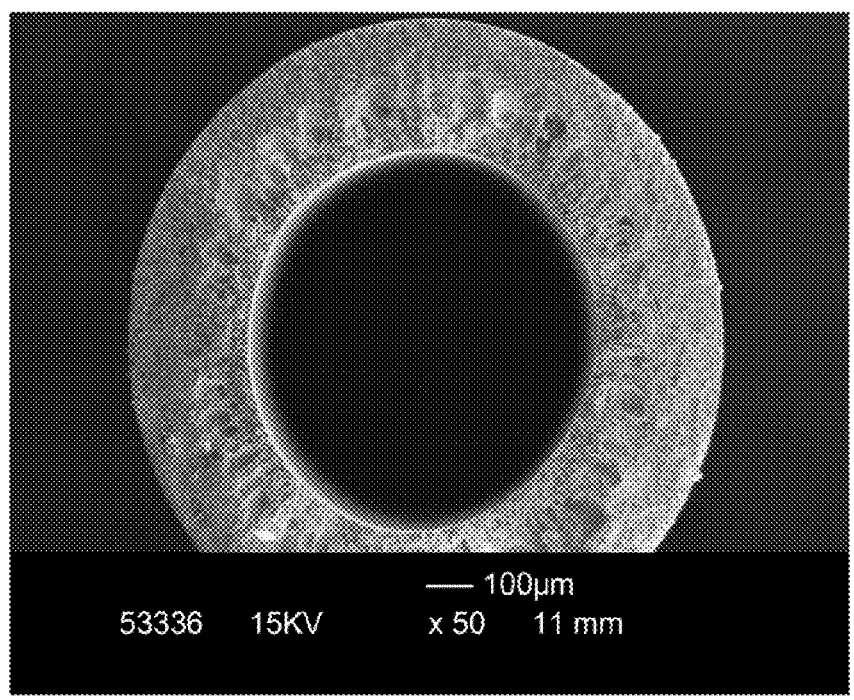
FIGS. 3A to 3H show the photographs of cross-sectional (FIGS. 3A to 3C), internal (FIGS. 3D to 3F) and superficial structures (FIGS. 3G to 3H) of PCS-ORCs according to several embodiments of the present invention.
Figure 3B:
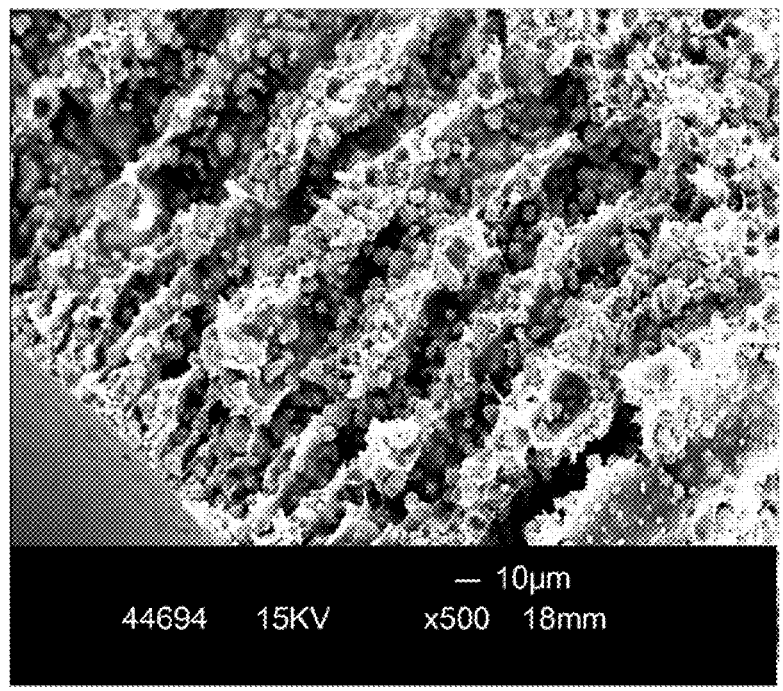
Figure 3C:
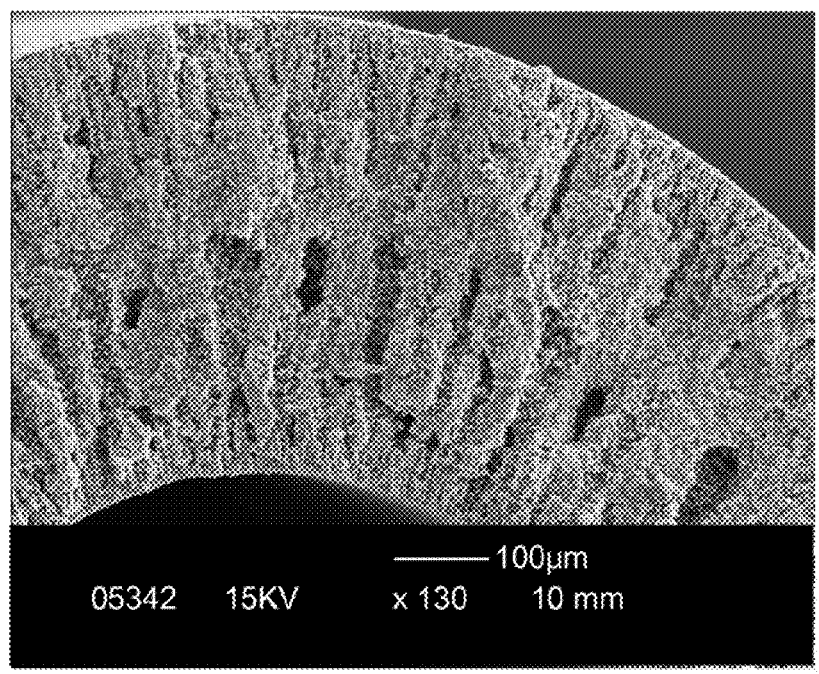
Figure 3D:
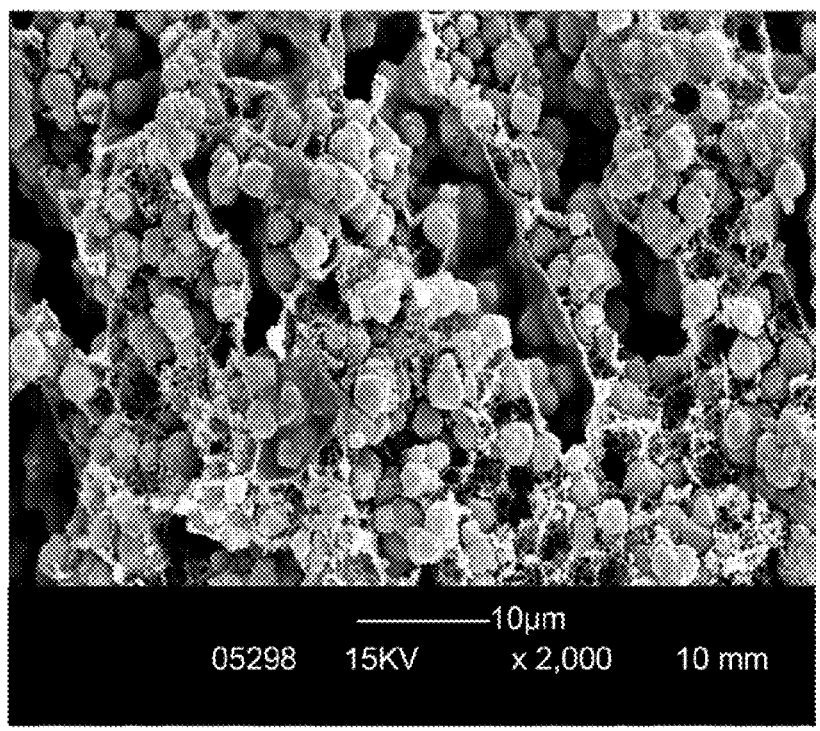
Figure 3E:
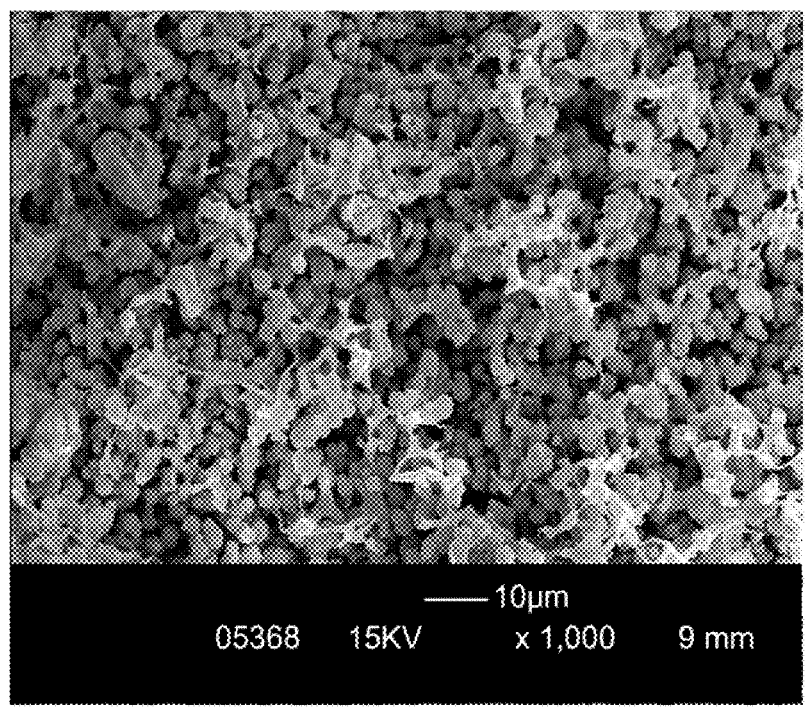
Figure 3F:
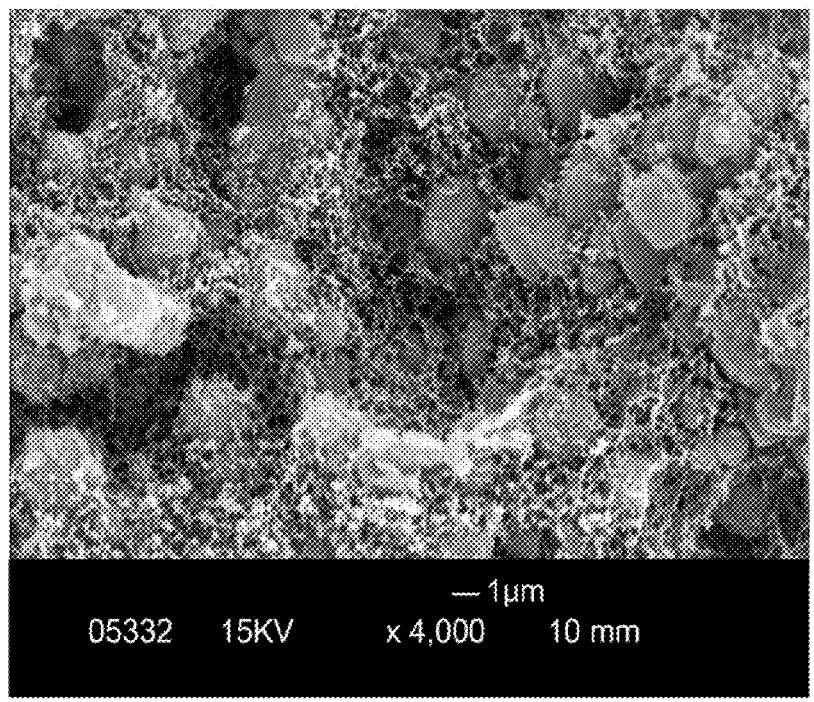
Figure 3G:
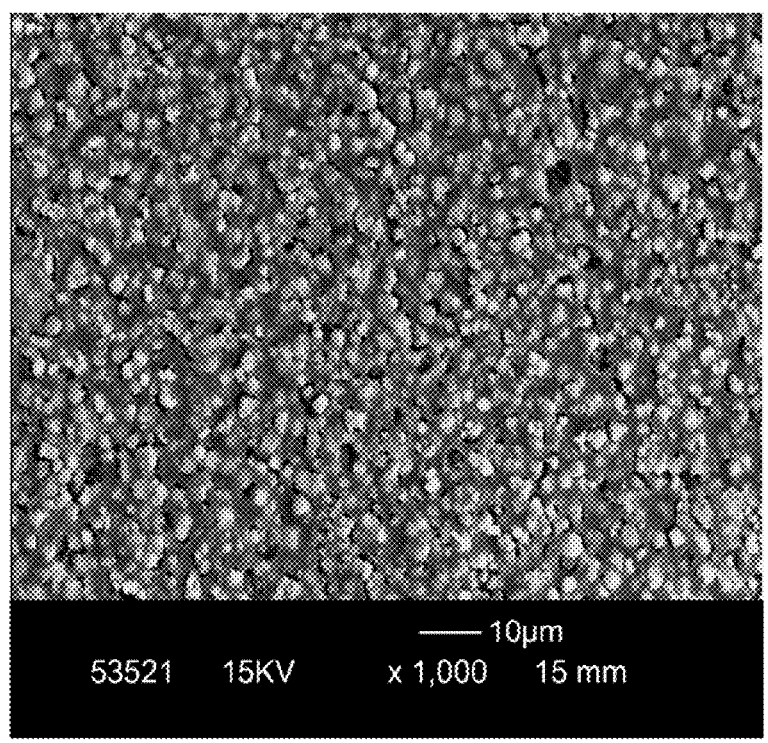
Figure 3H:
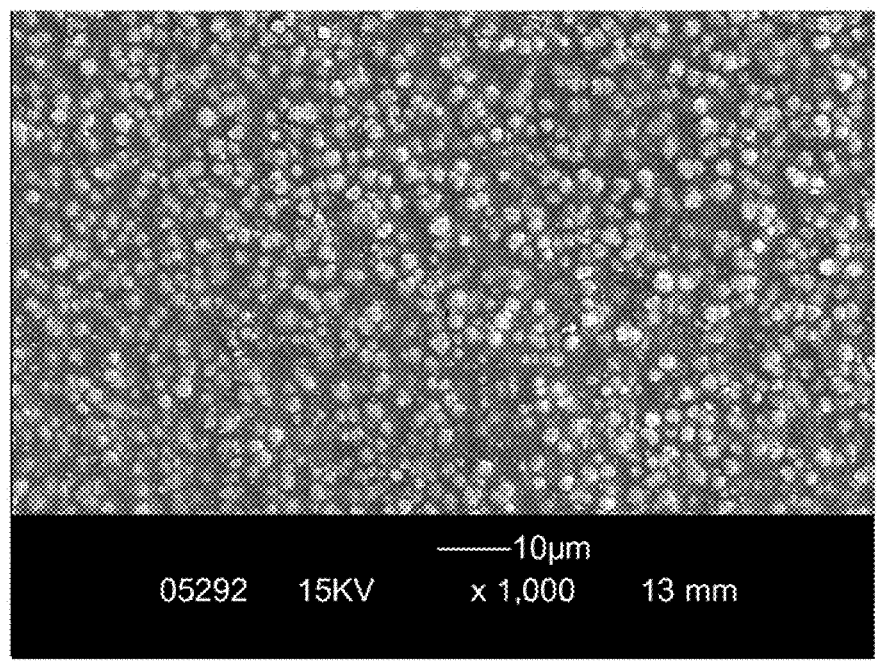

It is worth mentioning that, the aforementioned steps can be conducted in a batch process or a continuous process. For example, that refers to FIGS. 3A to 3H, which show the photographs of cross-sectional (FIGS. 3A to 3C), internal (FIGS. 3D to 3F) and superficial structures (FIGS. 3G to 3H) of PCS-ORCs according to several embodiments of the present invention. FIGS. 3A, 3D and 3G are photographs of a cross sectional, internal and superficial structures of PCS-ORCs with a hollow tube-like shape, respectively. FIGS. 3B and 3E are photograph of cross-sectional and internal structures of PCS-ORCs with a hollow rod-like shape, respectively. FIGS. 3C, 3F and 3H are photographs of cross-sectional, internal and superficial structures of PCS-ORCs with a hollow tube-like shape, respectively. Through the above processes, the aforementioned PCS-ORCs is well-functionalized, which has an internal coralloid-like channel structure (as shown in FIGS. 3A to 3F), surface pores (as shown in FIGS. 3G to 3H) with an average pore size from 1 nm to 100 μm on the surface.

Later, PCS-ORCs is immersed in a water-containing environment, for an instance, a flake-like PCS-ORCs, or a plate-like substrate combined with PCS-ORCs, may be placed into an ocean, a river, a lake, a sewerage, a ditch, an aquifer, a cistern, a sediment or soil; and for another instance, a granule-like, a hollow tube-like or a rod-like PCS-ORCs, or a granule-like, a hollow tube-like or a rod-like substrate combined with PCS-ORCs, may be mixed with soil. And then, water molecules diffuse into the internal coralloid-like channel structure through the pores and then contact with ORCs in PCS, so as to continuously release oxygen for one to six months long, up to one year or even over one year, thereby enhancing the growth of microbes and the biodegradation of contaminants in the water-containing environment. Similarly, PCS-ORCs can be applied to anaerobic biodegradation of contaminants.

Thereinafter, various applications of PCS-ORCs will be described in more details referring to several exemplary embodiments below, while not intended to be limiting. Thus, one skilled in the art can easily ascertain the essential characteristics of the present invention and, without departing from the spirit and scope thereof, can make various changes and modifications of the invention to adapt it to various usages and conditions.

EXAMPLE 1

Preparation of PCS-ORCs

1. Preparation of Mixture

In this EXAMPLE, 1-methyl 2 pyrrolidione (NMP; 99+% purity, Spectrophotometer Grade, Merck Co., U.S.A.) and polyethersulfone (PESF; Radel A-300, Ameco Performance, U.S.A.) as shown in following TABLE 1 (Experimental Groups) are firstly added into a 500 mL glass bottle, slowly stirred until PESF is completely dissolved. The total volume of NMP and PESF may be 50 mL to 400 mL, for example, rather than being limited thereto.

And then, ORCs such as magnesium peroxide ($MgO_2$), calcium peroxide ($CaO_2$; average diameter of 1.0 μm approximately, Sigma-Aldrich Co., U.S.A.) is added into the PESF/NMP solution, stirred in with a rotational speed of 500 rpm to 2000 rpm for 2 hours and 24 hours, approximately, thereby evenly dispersing magnesium peroxide or calcium peroxide in the PESF/NMP solution and forming a mixture.

TABLE 1

Amounts of ingredients in the mixture

| Experimental Groups | PESF/NMP (weight ratio) | $MgO_2$ (or $CaO_2$)/ PESF or $Fe^0$/ PESF (weight ratio) | buffering agent and/or bionutrient (peroxide + PESF) (optional; weight ratio) |
|---|---|---|---|
| 1 | 1/5 | 92/8 | 0.01/100 to 35/100 |
| 2 | 1/5 | 60/40 | |
| 3 | 1/5 | 50/50 | |
| 4 | 1/5 | 25/75 | |
| 5 | 1/5 | 5/95 | |
| Control Group | — | 100 | |

Later, a dispersion and stabilization step is conducted. In this step, a dispersant such as commercial dispersants of Hypermer™ KD-1~5 or KD-8~11 (Uniqema, Netherlands) is added with an amount of 0.1 part to 2 parts by weight of ORCs and polymers (PESF) into the mixture, and stirred in with a rotational speed of 50 rpm to 500 rpm for 6 hours and 24 hours approximately until the mixture is mixed in a steady state without immediate sedimentation, which can make PCS-ORCs have a better ORCs distribution inside, leveling appearance, and uniform color.

2. Formation of PCS-ORCs

Following, a formation and functionalization step is performed. The formation and functionalization may include but not be limited to perform a wet-forming and functionalizing step and a dry-forming and functionalizing step, so as to make the mixture to form PCS-ORCs coated on a substrate. In this example, during the wet formation and functionalization, the mixture may be swollen in a coagulant in a temperature of 0° C. to 40° C. or 5° C. to 15° C. for 0.5 minute to 5 minutes, for example, so as to remove NMP and the coagulant mostly, thereby forming a composite material. The composite material has a dense surface. The aforementioned coagulant may be methanol, ethanol, propanol, acetone, water or any combination thereof.

During the drying and functionalizing course, the as-synthesized material is conducted in a temperature range from 90° C. to 150° C. or from 100° C. to 120° C. for 15 minutes to 30 minutes, for example, which removes the residual organic solvent and coagulant and form PCS with thickness of 1 μm to 1000 μm or 50 μm to 500 μm on the substrate. In an example, the drying and functionalizing step may be also conducted in a temperature range from 100° C. to 120° C. The resulted PCS-ORCs has an internal coralloid-like channel structure therein, as shown in FIGS. 2A to 2C.

In addition, before conducting the drying and functionalizing step, the as-synthesized material may be optionally coated onto the other solid material uniformly by conventionally blade coating or spin-on coating skills. As exemplified by the blade coating method, the mixture can be poured into a blade adjuster, and the coating thickness of the mixture may be controlled by adjusting the height of the blade position according to different kinds of the blade coater. In an example, the height of the blade position may be set from 100 μm to 200 μm or other height rather than being limited thereto.

It is worth mentioning that, the aforementioned coating methods such as blade coating or spin-on coating methods are familiar to the artisan in this art rather than being recited in detail herein.

If the aforementioned steps are conducted by an automatically continuous process, PCS-ORCs can be separated from the underlying conveyor belt.

EXAMPLE 2

Evaluation of Oxygen-Releasing Rate and pH Effect of PCS-ORCs

EXAMPLE 2 is related to evaluate the prolonged gas-releasing rate of PCS-ORCs of EXAMPLE 1 immersed in the water-containing environment.

Figure 4:
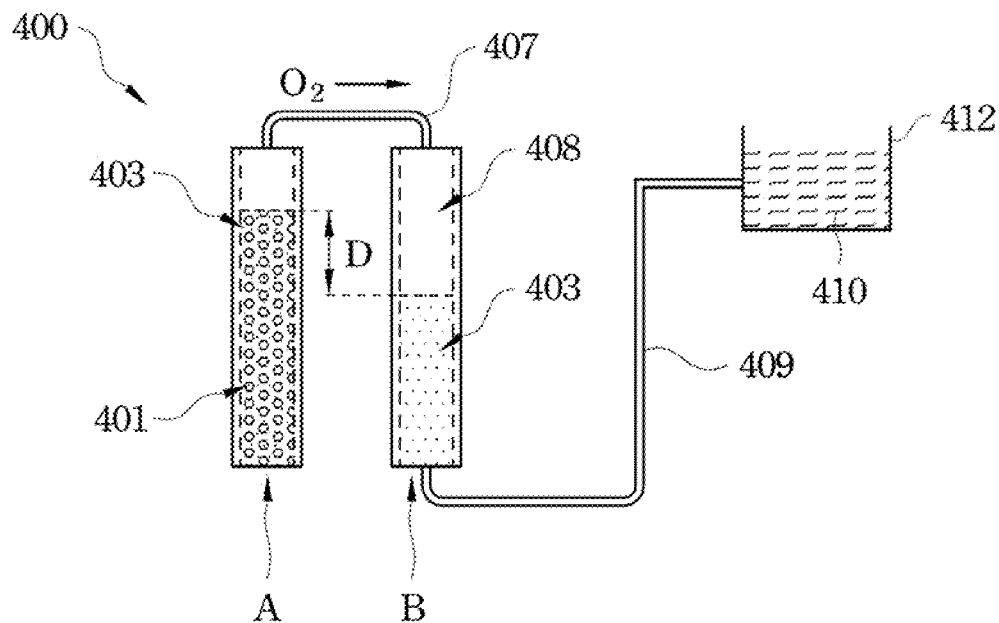
FIG. 4 depicts a schematic diagram of a setup for measuring oxygen-releasing rate of PCS-ORCs of EXAMPLE 1.

Reference is made to FIG. 4, which depicts a schematic diagram of a setup for measuring released oxygen from PCS-ORCs of EXAMPLE 1. In this EXAMPLE, the setup 400 includes a pair of a cartridge A and a cartridge B connected in parallel by a tube 407. The cartridge A includes a sample 401 therein, for example, any types of PCS-ORCs of EXAMPLE 1 or calcium peroxide ($CaO_2$) powders (as control), and then the cartridge A and the cartridge B are filled with the equal water level (height). When the sample 401 is immersed in water 403 for a long period, oxygen can be continuously generated and then pass through the tube 407 into a space 408 of the cartridge B. The accumulated oxygen in the space 408 of the cartridge B pushes the equal volume of the overflow water 410 through the tube 409 into a container 412, where the tube 409 has an opening (unshown) that is connected to the container 412 and a little higher than the water level in the cartridge B. Hence, the released oxygen can be measured in milliliters (mL) by daily recording the volume of the overflow water 410.

Figure 5:
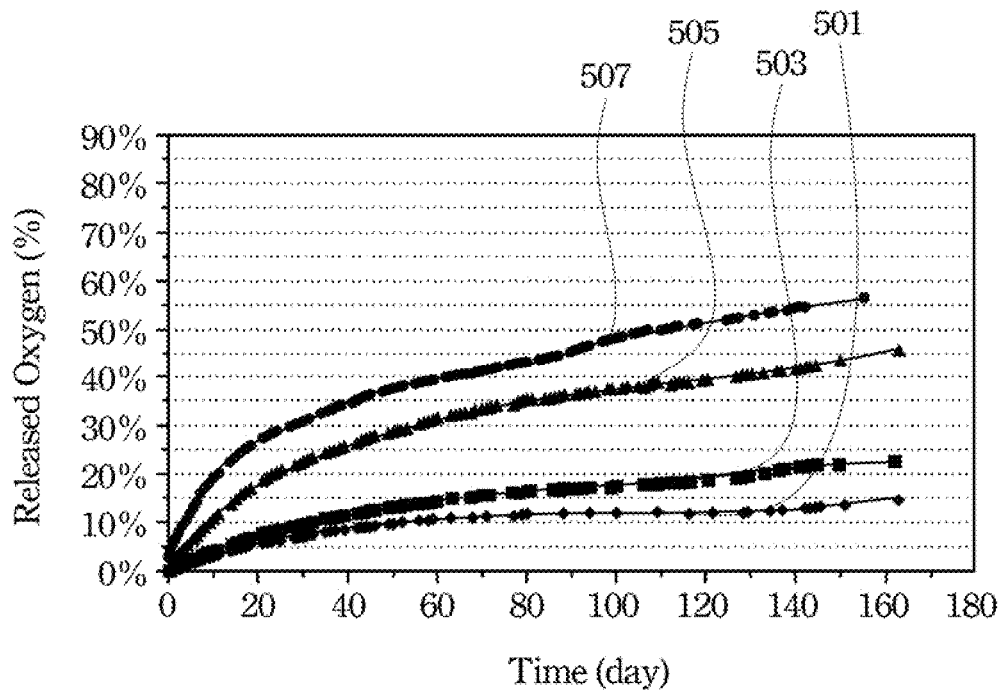
FIG. 5 depicts a curve diagram of released oxygen percentage of PCS-ORCs presented in FIG. 4.

Reference is made to FIG. 5, which depicts a curve diagram of released oxygen percentage of PCS-ORCs immersed in the device of FIG. 4. In FIG. 5, the horizontal axis is referred as the immersion duration (day) of PCS-ORCs or bare ORCs ($CaO_2$ powders), the vertical axis is referred as an accumulated released oxygen percentage (%), which is the percentage of the overflowed water measured by the setup of FIG. 4 to the theoretically generated oxygen. In FIG. 5, the symbol ● is referred to the released oxygen percentage (%) of the bare ORCs ($CaO_2$ powders; as the control group), the symbol ♦ is referred to the released oxygen % of type A PCS-$CaO_2$ (PESF/solvent (wt %): 20/80; $CaO_2$/polymer (wt %): 80/20), the symbol ■ is referred to the released oxygen % of type B PCS-$CaO_2$ (PESF/PVP/solvent (wt %): 15/5/80; $CaO_2$/polymer (wt %): 80/20), the symbol ▲ is referred to the released oxygen % of type C PCS-$CaO_2$ (PESF/solvent (wt %): 25/75; $CaO_2$/polymer (wt %): 80/20).

According to the results in FIG. 5, the released oxygen percentage (%) of the bare ORC ($CaO_2$ powders; denoted as the symbol ●) that contacted with water completely and then released oxygen very fast in the absence of PCS (PESF). The generated oxygen of the bare ORCs ($CaO_2$ powders) was quick (shown as the curve 507) in the beginning but afterward slowed down possibly due to the accumulation of calcium hydroxide ($Ca(OH)_2$). On the other hand, types A, B and C PCS-$CaO_2$ of EXAMPLE 1 (denoted as the symbols ♦, ■ and ▲, respectively) showed different oxygen-releasing rates (shown as the curves 505, 503 and 501, respectively) when immersed in the setup. Those PCS-ORCs could continuously release the gas (oxygen) for over 160 days long. These curves showed stable trends, which could be expected to continue for a longer period, for example, one to six months, up to one year or even over one year.

Figure 6A:
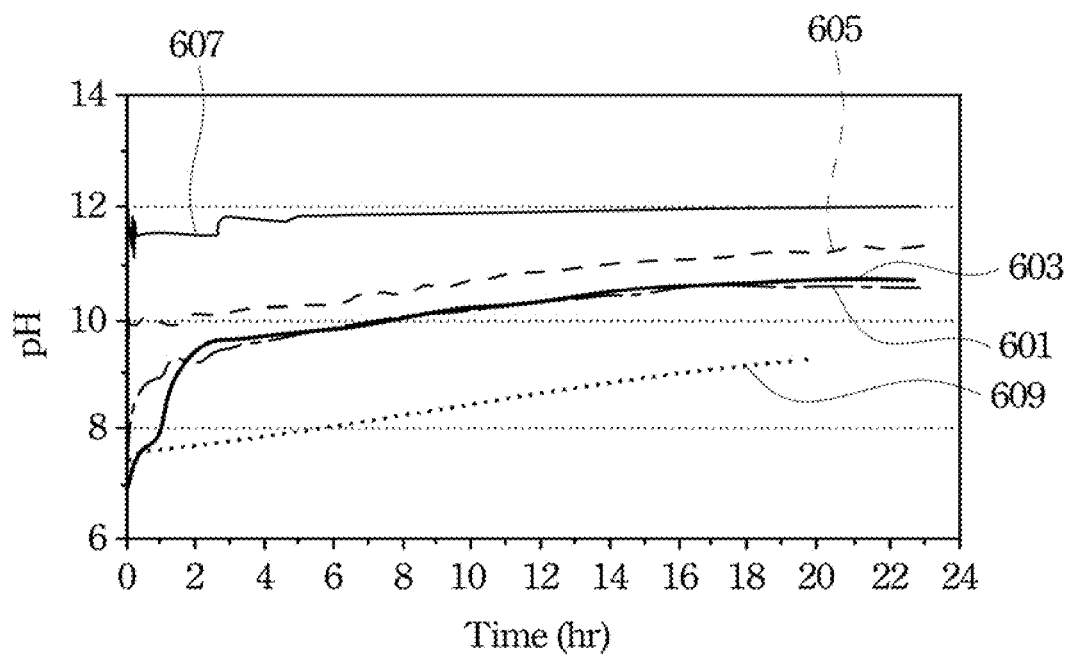
FIG. 6A depicts a curve diagram of pH variation over time when PCS-ORCs is immersed in a batch system as FIG. 6B.
Figure 6B:
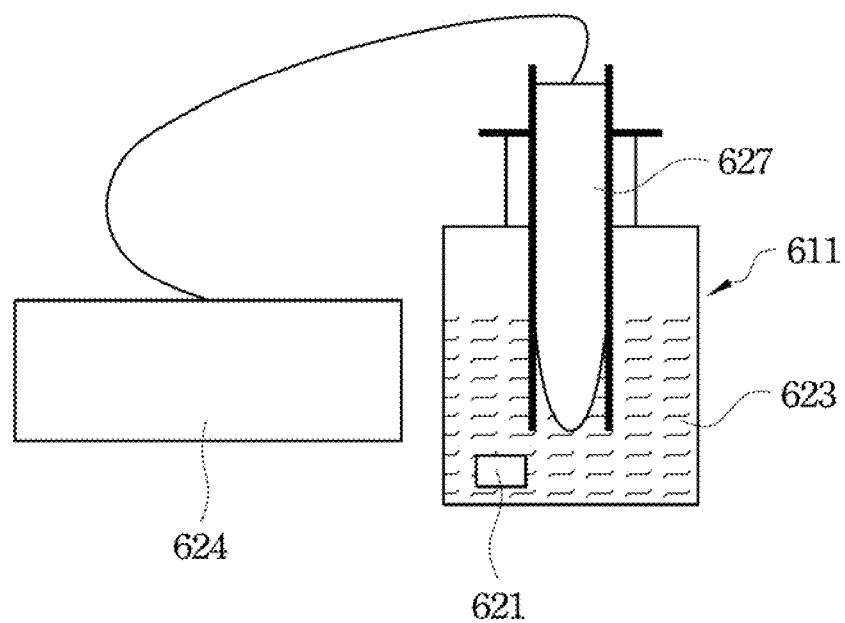
FIG. 6B depicts a schematic diagram of a batch system for detecting and recording pH variation over time when PCS-ORCs are immersed in deionized water or sewage according to an embodiment of the present invention.

Reference is made to FIGS. 6A and 6B. FIG. 6A depicts a curve diagram of pH over time when PCS-ORCs are immersed in a batch system as FIG. 6B. In FIG. 6A, the horizontal axis is referred as the duration time (hours) of a sample 621 (for example, PCS-ORCs or bare ORCs ($CaO_2$ powders)) immersed in deionized water (or sewage) 623 in a container 611, and the vertical axis is referred as pH values that were detected by a pH probe 627 and recorded by a data acquisition system 624 of FIG. 6B. The curve 601 is referred to the pH variation of type A PCS-$CaO_2$ (PESF/solvent (wt %): 20/80; $CaO_2$/polymer (wt %): 80/20), the curve 603 is referred to the pH variation of type B PCS-$CaO_2$ (PESF/PVP/solvent (wt %): 15/5/80; $CaO_2$/polymer (wt %): 80/20), the curve 605 is referred to the pH variation of type C PCS-$CaO_2$ (PESF/solvent (wt %): 25/75; $CaO_2$/polymer (wt %): 80/20), and the curve 607 is referred to the pH variation of bare ORCs ($CaO_2$ powders; as the control group). The curve 609 is referred to the pH variation of type B PCS-$CaO_2$ (PESF/PVP/solvent (wt %): 15/5/80; $CaO_2$/polymer (wt %): 80/20) immersed in groundwater that was sampled from a petroleum-contaminated site.

According to the results in FIG. 6A, the bare ORCs ($CaO_2$ powders) caused a fast increase of pH (shown as the curve 607), while the types A, B and C PCS-$CaO_2$ of EXAMPLE 1 (shown as curves 601, 603, 605) were able to retard the pH increase to some degree, respectively. In real groundwater (shown as curves 609) which usually has natural buffering capability, the pH effect of type B PCS-$CaO_2$ was even smaller, which could favor the growth and contaminant degradation of aerobes in soil and groundwater environment.

EXAMPLE 3

Evaluation of Dissolved Oxygen, pH, Oxidation Reduction Potential and Electrical Conductivity of PCS-ORCs in Pilot Field Test EXAMPLE 3 is related to evaluate the groundwater parameters of PCS-ORCs of EXAMPLE 1 applied in a pilot field test. Similar results were obtained from the type-B PCS-$CaO_2$ of EXAMPLE 1 in the pilot test.

Figure 7A:
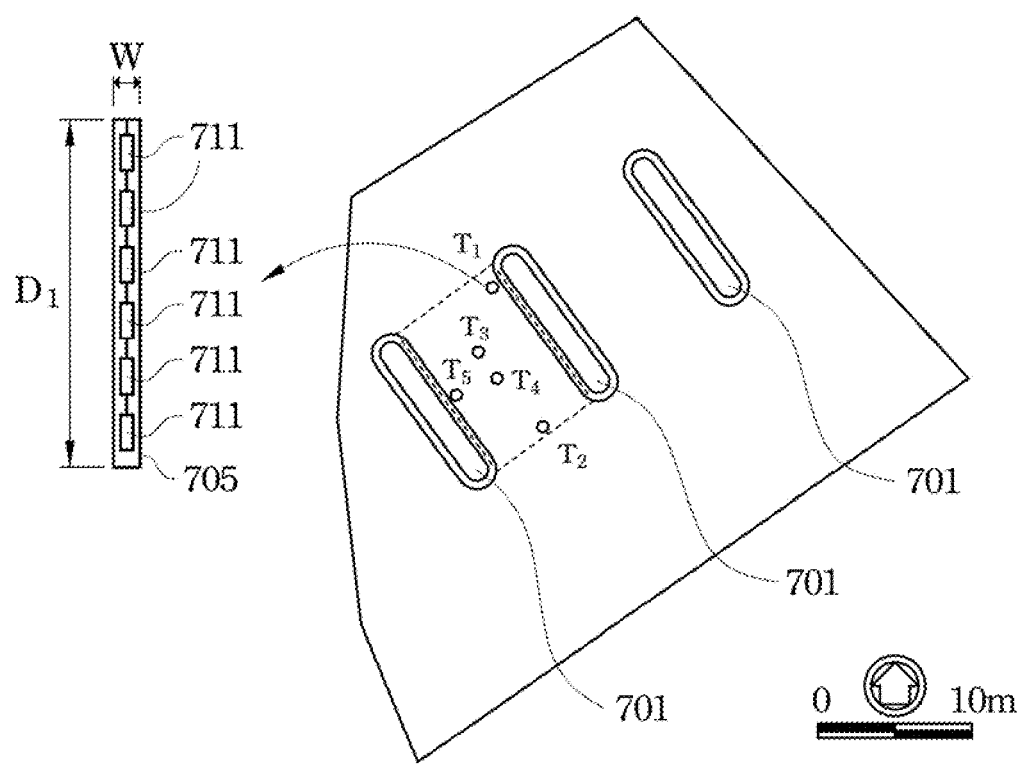
FIG. 7A depicts a plan view of the type-B PCS-ORCs applied in the pilot test
Figure 7B:
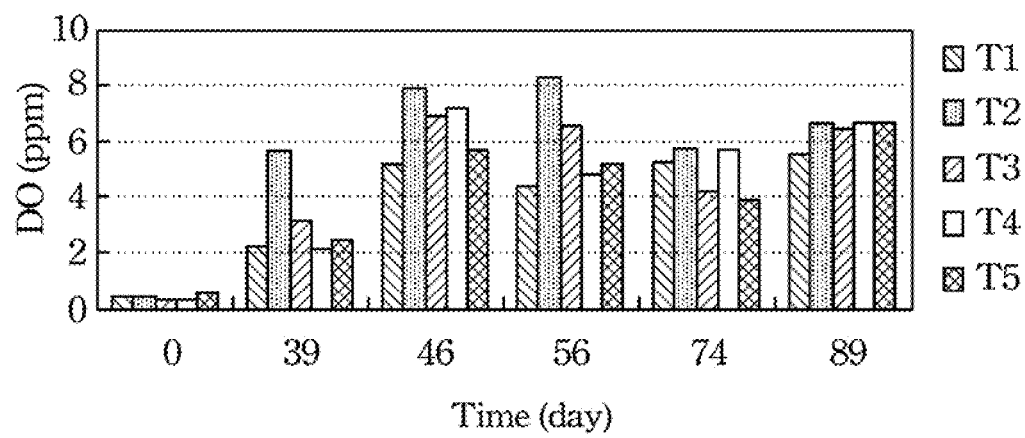
FIGS. 7B to 7E depict bar diagrams of dissolved oxygen (FIG. 7B), pH variations (FIG. 7C), oxidation-reduction potential (FIG. 7D) and electrical conductivity (FIG. 7E) of the type-B PCS-ORCs applied in the pilot test.
Figure 7C:
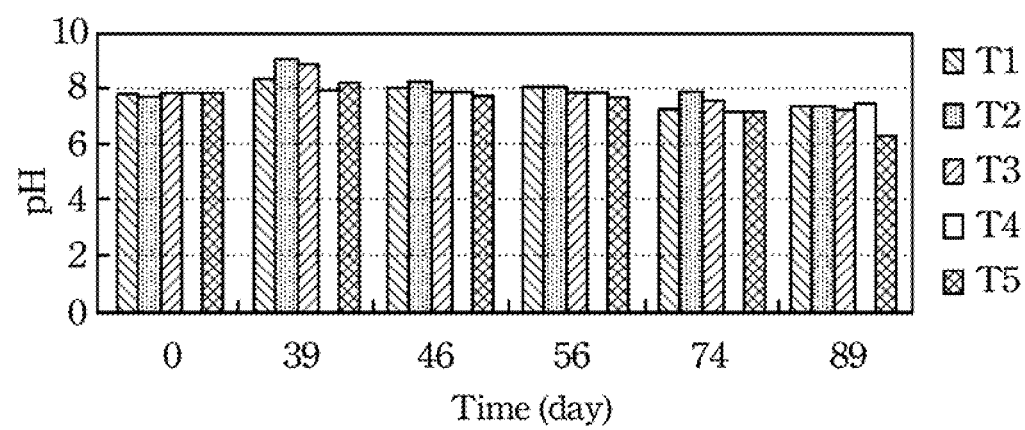
Figure 7D:
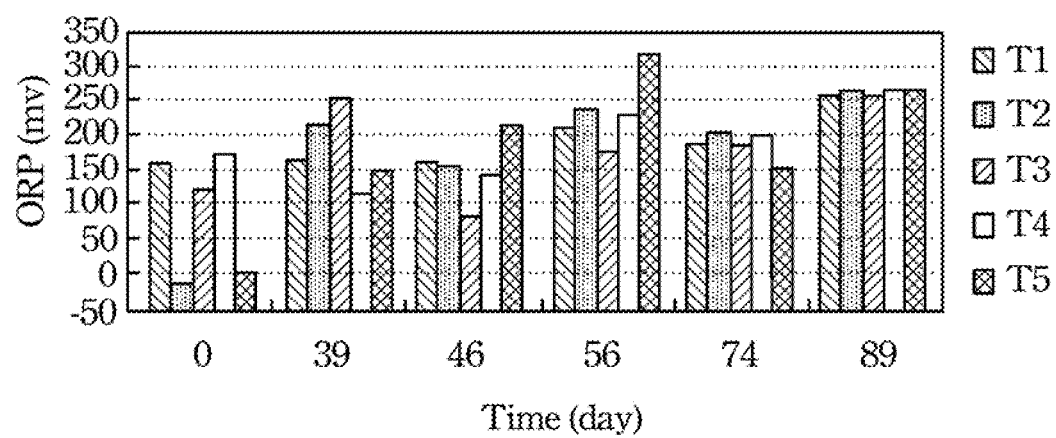
Figure 7E:
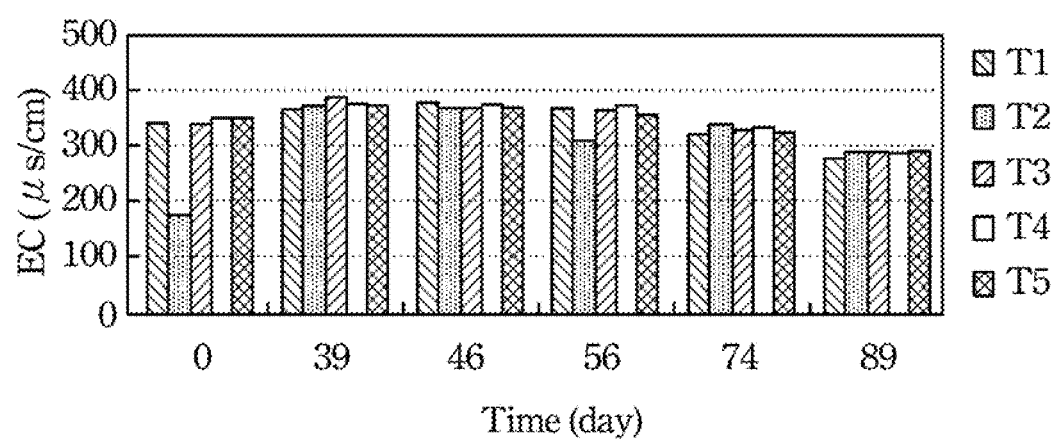

Reference is made to FIG. 7A, which depicts a plan view of the type-B PCS-ORCs applied in the pilot test. The pilot test was conducted in a gasoline station located at Pingtung county in Taiwan, for example. The type-B PCS-ORCs 711 were shaped as hollow rods (length: 30 cm and diameter: 0.6 inch) and linked to each other to a set. Each set had 6 linked rods and a total weight of about 1 kg, for example. The linked type-B PCS-ORCs 711 were immersed into T1 to T5 wells, which had a depth of about 4.5 meters and a diameter of about 1 inch, between two adjacent fuel docks 701. T1 and T5 wells were near the fuel docks 701, T3 and T4 wells were in the middle region of the two adjacent fuel docks 701, and T2 well was located in the peripheral region of the two adjacent fuel docks 701.

Reference is made to FIGS. 7B to 7E, which depict bar diagrams of dissolved oxygen (DO; ppm), pH variation, oxidation-reduction potential (ORP; mv) and electrical conductivity (EC; μs/cm) of the type-B PCS-ORCs applied in the pilot test. In FIGS. 7B to 7E, the horizontal axis is referred as the immersed duration (days) of PCS-ORCs or bare ORCs ($CaO_2$ powders), the vertical axis is referred as DO (FIG. 7B), pH (FIG. 7C), ORP (FIG. 7D) and EC (FIG. 7E) that were measured by using electric probes.

According to the results in FIGS. 7B to 7E, the type-B PCS-ORCs significantly enhanced the dissolved oxygen concentration and ORP without obviously changing pH, and EC values in the groundwater in FIG. 7A, which was a favorable condition for aerobic biodegradation of contaminants.

In addition, it is necessarily mentioned that, specific ORC, specific polymeric materials, specific polymeric carriers, specific reaction conditions, specific substrates, specific apparatuses or specific water-containing environments are employed as exemplary embodiments in the present invention for clarifying PCS-ORCs of the present invention, however, as is understood by a person skilled in the art, other ORCs, other polymeric carriers, other reaction conditions, other substrates, other apparatuses or other water-containing environments can be also employed in the PCS-ORCs of the present invention, rather than limiting to thereto.

According to the embodiments of the present invention, the aforementioned PCS-ORCs and manufacturing thereof, they advantageously include that the internal coralloid-like channel structure in PCS can accommodate more amount of the ORCs, and that PCS-ORCs may be shaped as various types. As PCS-ORCs is immersed in a water-containing environment, water molecules diffuse into the internal coralloid-like channel structure through the surface pores and then contact with the ORCs, so as to continuously release oxygen for one to six months or more long, thereby enhancing the growth and metabolism of microorganisms in the water-containing environment.

As is understood by a person skilled in the art, the foregoing embodiments of the present invention are illustrated of the present invention rather than limiting of the present invention. It is intended to cover various modifications and similar arrangements included within the spirit and scope of the appended claims. Therefore, the scope of which should be accorded the broadest interpretation so as to encompass all such modifications and similar structure.

What is claimed is:

1. A polymeric complex supporter for controlling oxygen-releasing compounds (PCS-ORCs), comprising:
   1 part to 92 parts by weight of ORCs, wherein the ORCs comprises peroxides and has an average diameter from 1 nanometer (nm) to 100 micrometers (μm); and
   8 parts to 50 parts by weight of PCS, wherein the PCS and the ORCs are mixed, the PCS possesses an internal coralloid-like channel structure and surface pores with an average pore size from 1 nm to 100 μm, and the PCS belongs to sulfone polymers or fluorine-containing polymers, and
   wherein as the PCS-ORCs is delivered into a water-containing environment, water molecules can diffuse into the internal coralloid-like channel structure through the surface pores and then react with ORCs, so as to continuously release out oxygen through the surface pores for one to six months long, thereby enhancing aerobic biodegradation process in the water-containing environment.

2. The PCS-ORCs according to claim 1, wherein the peroxides are selected from the group consisting of magnesium peroxide, calcium peroxide and any combination thereof.

3. The PCS-ORCs according to claim 1, wherein the amount of ORCs in PCS is from 10 parts to 92 parts by weight.

4. The PCS-ORCs according to claim 1, wherein the sulfone polymers are selected from the group consisting of polyethersulfone (PESF), polysulfone (PSF) and polyphenylene sulfone (PPSF).

5. The PCS-ORCs according to claim 1, wherein the fluorine-containing polymer is polyvinylidene fluoride (PVDF).

6. The PCS-ORCs according to claim 1, further comprising buffering reagents, wherein the buffering reagents are selected from the group consisting of calcium carbonate, calcium bicarbonate and any combination thereof.

7. The PCS-ORCs according to claim 1, further comprising bionutrients are selected from the group consisting of sugar, starch, phosphate and any combination thereof.

8. The PCS-ORCs according to claim 1, further comprising dispersants, wherein the amount of the dispersants in PCS is 0.1 part to 2 parts by weight, and the dispersants are selected from the group consisting of polycarbonate, polyvinyl alcohol, polyacrylamide and any combination thereof.

9. The PCS-ORCs according to claim 1, wherein the water-containing environment refers to ocean, river, lake, sewerage, ditch, aquifer, cistern, sediment or soil.

* * * * *